(12) United States Patent
Muerza

(10) Patent No.: US 7,281,400 B2
(45) Date of Patent: Oct. 16, 2007

(54) PADLOCK FOR MOTORCYCLE BRAKE DISK

(75) Inventor: Alfredo Muerza, Guipuzcoa (ES)

(73) Assignee: Luma Industries, S.A., Hernani, (Guipuzcoa) (ES)

( * ) Notice: Subject to any disclaimer, the term of this patent is extended or adjusted under 35 U.S.C. 154(b) by 0 days.

(21) Appl. No.: 11/272,584

(22) Filed: Nov. 10, 2005

(65) Prior Publication Data

US 2006/0096342 A1    May 11, 2006

(30) Foreign Application Priority Data

Nov. 11, 2004    (ES)    ............... 200402559 U

(51) Int. Cl.
*B62H 5/00*    (2006.01)

(52) U.S. Cl. ............... 70/233; 70/32; 70/226

(58) Field of Classification Search ............ 70/32–34, 70/233, 226

See application file for complete search history.

(56) References Cited

U.S. PATENT DOCUMENTS

| | | | | |
|---|---|---|---|---|
| 1,907,625 A | * | 5/1933 | Vogt ............... | 70/100 |
| 2,845,789 A | * | 8/1958 | Kistner ............ | 70/90 |
| 5,365,758 A | * | 11/1994 | Shieh ............. | 70/33 |
| 5,442,941 A | * | 8/1995 | Kahonen et al. ... | 70/34 |
| 5,713,224 A | * | 2/1998 | Liou .............. | 70/34 |
| 5,819,889 A | * | 10/1998 | Shieh ............ | 188/265 |
| 5,964,107 A | * | 10/1999 | Chang ........... | 70/33 |
| 2004/0031298 A1 | * | 2/2004 | Lai .............. | 70/33 |

* cited by examiner

*Primary Examiner*—Suzanne Dino Barrett
(74) *Attorney, Agent, or Firm*—Lucas & Mercanti, LLP

(57) ABSTRACT

A padlock for motorcycle brake disks having a body with a neck whose width is adjusted to the thickness of a motorcycle brake disk, and a latch which can pass through one of the conventional orifices of this brake disk. The latch operates between a retracted position within the body and an extended position in which it penetrates with its tip into a locking mechanism formed inside the body itself. Once the padlock has been positioned on the disk brake, the body prevents turning of the wheel because it abuts against the motorcycle chassis.

4 Claims, 4 Drawing Sheets

PADLOCK FOR MOTORCYCLE BRAKE DISK

SCOPE OF THE INVENTION

This invention concerns a padlock for motorcycle brake disks of a general nature consisting of a body comprising a neck whose width is adjusted by an excessive dimension to the thickness of a motorcycle brake disk, such that one of the conventional orifices of this brake disk can be passed through by a latch that operates between a retracted position within the body and an extended position in which it penetrates with its tip into a locking mechanism formed inside the body itself. Once the padlock has been positioned in the disk brake, it is its own body that prevents turning of the wheel due to the fact that it abuts against the motorcycle chassis.

PRIOR ART

Various padlock devices are known in this field that use locks actuated by a key.

Another inconvenience of these key locking systems consists precisely of the fact that it is possible to lose the key which, if the user does not have another copy, may make it necessary to destroy the padlock in order to use the motorcycle and, of course, to acquire a new padlock. Or, what is even worse, the key may be stolen or copied by someone observing us in order to appropriate themselves of our motorcycle while we are elsewhere.

EXPLANATION OF THE INVENTION AND ADVANTAGES

Considering this prior art, the aim of the present invention is to provide a disk brake padlock with a locking system that does not require a key, but whose opening and closing are controlled by a set of combination wheels.

Thus, according to the padlock structure proposed by this invention, within the body of the padlock the tail of said latch is inserted and immobilised in a cylinder that is accommodated in the body and enables sliding rotary and axial adjustment and which is closed at its other extreme and externally forms a handle that rests on the periphery of said body, whose cylinder comprises on its periphery a spherical indentation and a groove, the spherical indentation being reciprocal to the spherical shell of a ball which, in diametrical opposition, is applied against the tip of the shaft that belongs to a rotary-ring combination lock and where, at its other extreme, this shaft presses against an opposing spring, which presses it against said ball, and said groove has the shape of an "L" determined by both branches, horizontal and vertical, in which, with sliding adjustment, there is located a pin anchored in said body of the padlock whose vertical branch extends towards said locking mechanism with an effective length equal to the operative distance between said retracted and extended positions of the latch; between the cylinder and the base of where it is accommodated in said body there is inserted a helical spring that has a relatively compressed state in which the latch is in its locking mechanism and the pin is in the horizontal branch or in the top extreme of the vertical branch of said groove, and this helical spring has another relatively distended state in which the latch is in its retracted state in the body, the cylinder protrudes out of this body and the pin is in the bottom extreme of the groove's vertical branch.

Preferably, in this structure, it is achieved that the horizontal branch of the groove has a rotary extension of one quarter of a turn; the fact that there is a rotary offset between the spherical indentation and the start of the horizontal branch of the groove is also preferably achieved, the offset preferably being one quarter of a turn in the rotation direction in which said pin passes through the horizontal branch of the groove until it meets up with the vertical branch of the same.

Operation of this structure is simple and reliable. We start from the closed position of the padlock in which: the cylinder is retracted in the body of the padlock, the ball is accommodated in the spherical indentation of the cylinder, the shaft of the combination lock is against the ball as a result of the pressure of its opposing spring, the pin of the body is in the top extreme of the horizontal branch of the groove in an "L" shape, the latch is inside its locking mechanism in the body and, of course, the wheels of the combination lock are in a position different to the one corresponding to the valid opening code which assures the advanced position of the shaft of the same which firmly pushes the ball against its specific shaft indentation.

When the combination lock wheels are placed in the code position, their shaft is placed in a position to retract against said opposing spring; in this situation, the cylinder stays in place and, therefore, the latch is also in its locking mechanism.

To achieve definitive opening of the padlock to enable its withdrawal from the disk brake, it is necessary to actuate the cylinder in the following way: you take the handle of the cylinder and turn it in the direction in which the pin of the body passes through the horizontal branch of the groove in an "L" shape and reaches the top extreme of its vertical branch, the moment at which the expansive action of the helical spring causes the cylinder to rise, dragging with it the latch which causes it to move out of its locking mechanism and totally retracting it in the body so as to enable withdrawal of the padlock; with ease, this rotary operation ensures that the ball leaves the spherical indentation of the cylinder, precisely due to the rounded configuration of both surfaces encountered.

It is effectively verified that this padlock solution does away with the use of a key in a simple manner that is easy to use and which is of efficient and reliable functioning.

DRAWINGS AND REFERENCES

To enable a better comprehension of the nature of the present invention, on the drawings attached we present a preferable form of industrial realisation, this having a merely illustrative and non-limiting character.

Figure 3:
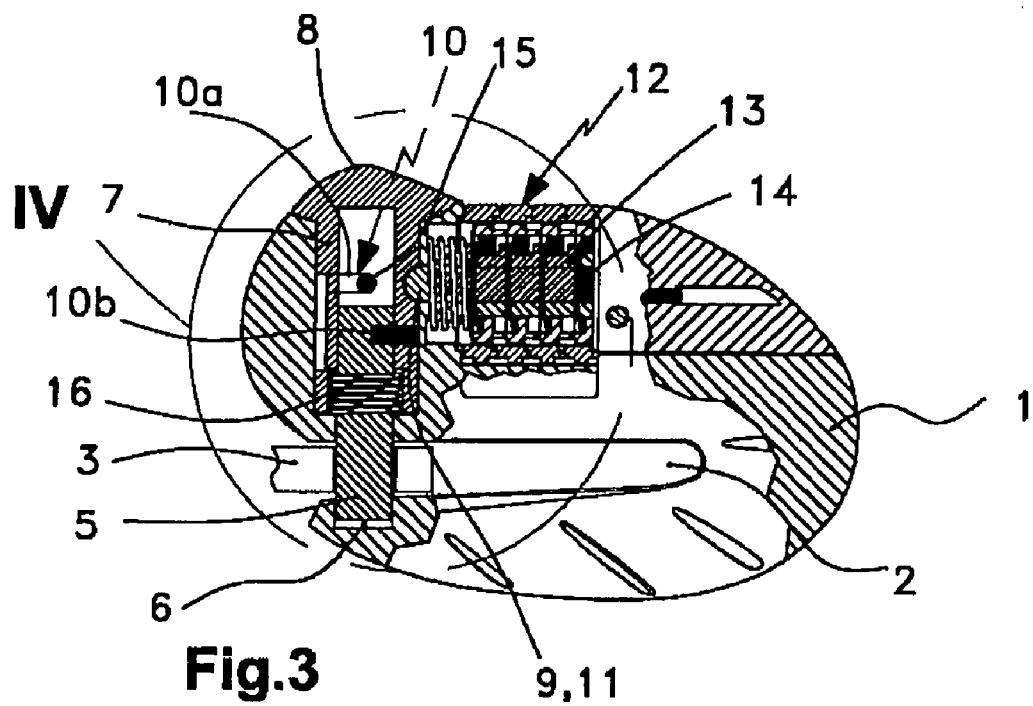
FIG. 3 is the view corresponding to Section III-III indicated in FIG. 2; the depiction, also cross-sectional, of the disk brake (3), is also incorporated in this figure.
Figure 1:
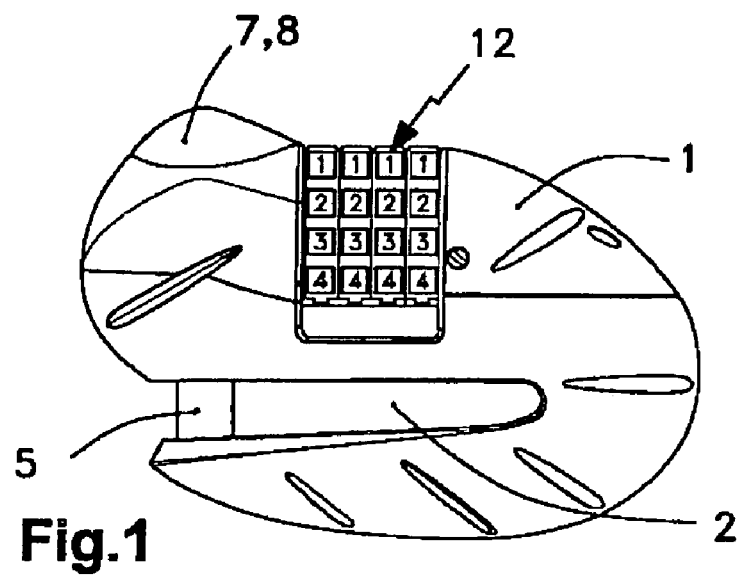
FIG. 1 is a side view of a padlock according to the invention in the closed state.
Figure 2:
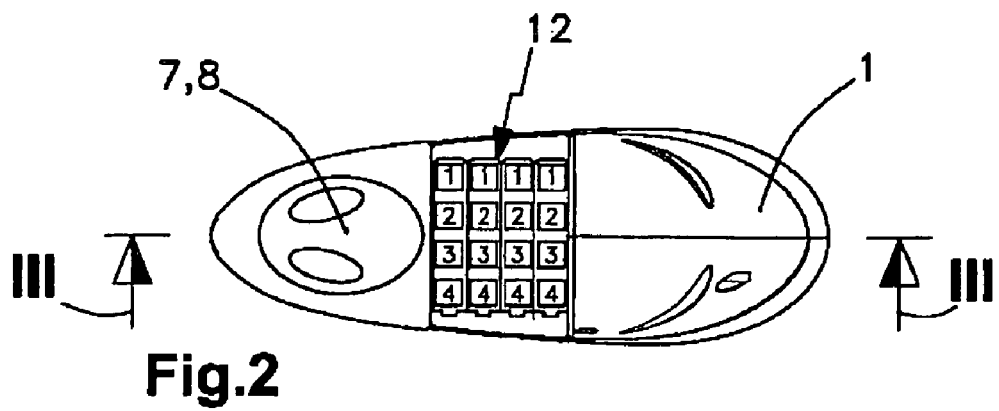
FIG. 2 is the top outline view corresponding to FIG. 1.

The following references are indicated in these figures:
1.—Padlock body
2.—Neck of the body (1)
3.—Brake disk
4.—Disk orifice (3)
5.—Latch
6.—Locking mechanism
7.—Cylinder
8.—Cylinder handle (7)
9.—Spherical indentation of the cylinder (7)
10.—"L"-shaped groove of the cylinder
10a.—Horizontal branch of the groove (10)
10b.—Vertical branch of the groove (10)
11.—Ball
12.—Combination lock
13.—Lock shaft (12)
14.—Opposing spring
15.—Pin of body (1)
16.—Helical spring

PRESENTATION OF A PREFERRED EMBODIMENT

In relation to the drawings and numbered references above, the attached diagrams show a preferential method of realisation of the present invention; concerning a padlock for use on the brake disk of a motorcycle and which, like others in its class, is based on a general structure consisting of a body (1) provided with a neck (2) whose width is adjusted by an excess dimension to the thickness of a motorcycle brake disk (3), in such a way that one of the conventional orifices (4) of this brake disk (3) can be passed through by a latch (5) which operates between a retracted position within the body (1) and an extended position in which its tip penetrates into a locking mechanism (6) created within the body itself (1).

Figure 4:
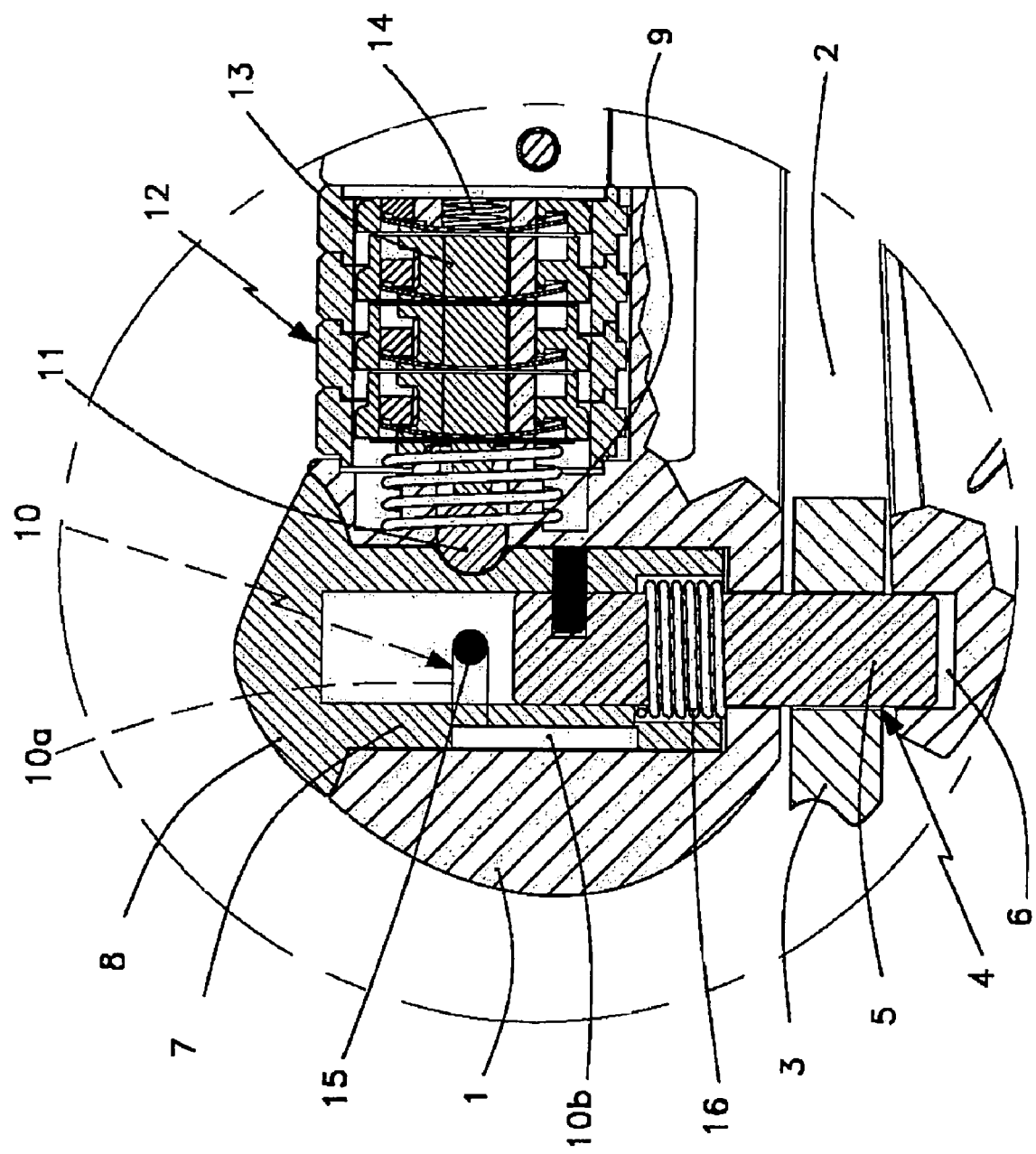
FIG. 4 is an enlarged view of Detail IV circled in FIG. 3.

The structure advocated is clearly illustrated in FIG. 4 and consists of the fact that, within the body (1), said latch has its tail inserted and immobilised in a cylinder (7) which is accommodated in the body (1) with rotary sliding adjustment and which is closed at its other extreme and externally forms a handle (8) that rests on the periphery of said body (1), whose cylinder (7) features on its periphery a spherical indentation (9) and a groove (10), the spherical indentation (9) being reciprocal to the spherical shell of a ball (11) which, in diametrical opposition, is applied against the tip of the shaft (13) that belongs to a rotary-ring combination lock (12) and where, at its other extreme, this shaft (13) presses against an opposing spring (14), which presses it against said ball (11), and said groove (10) has the shape of an "L" determined by both branches, horizontal (10a) and vertical (10b), in which, with sliding adjustment, there is located a pin (15) anchored in said body(1) of the padlock, whose vertical branch (10b) extends towards said locking mechanism (6) with an effective length equal to the operative distance between said retracted and extended positions of the latch (5); between the cylinder (7) and the base of where it is accommodated in said body (1) there is inserted a helical spring (16) that has a relatively compressed state in which the latch (5) is in its locking mechanism (6) and the pin (15) is in the horizontal branch (10a) or in the top extreme of the vertical branch (10b) of said groove (10), and this helical spring (16) has another relatively distended state in which the latch (5) is in its retracted state in the body (1), the cylinder (7) protrudes out of this body (1) and the pin (15) is in the bottom extreme of the groove's (10) vertical branch (10b).

Some preferential details of this structure consist of the fact that the horizontal branch (10a) of the groove (10) has a rotary extension of one quarter turn; in which there is a rotary offset between the spherical indentation (9) and the start of the horizontal branch (10a) of the groove (10); and in which this rotary offset is one quarter turn according to the direction of rotation in which said pin (15) passes through the horizontal branch (10a) of the groove (10) until it meets up with the vertical branch (10b) of the same.

Figure 5:
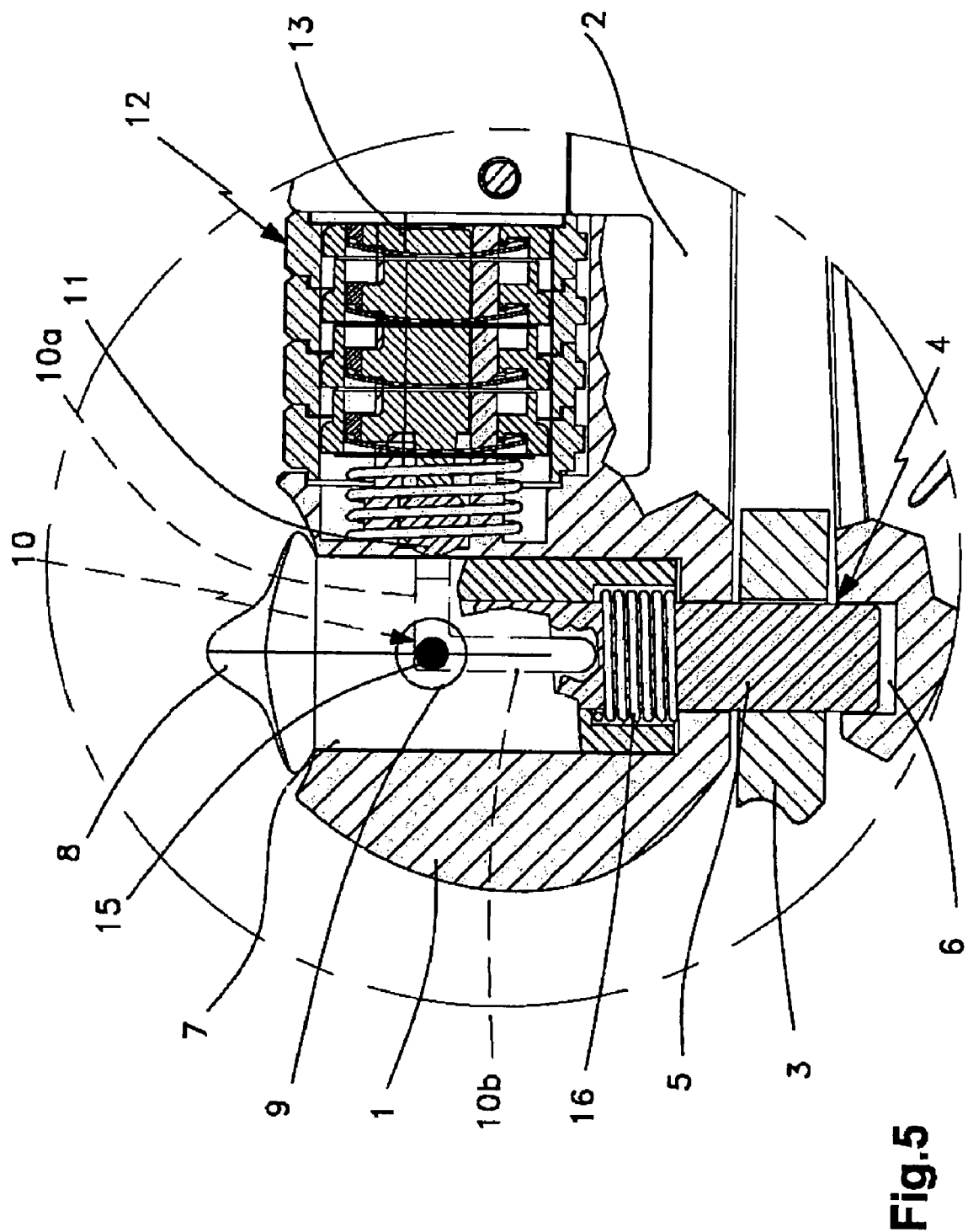
FIG. 5 is like FIG. 4, but showing the first phase of opening of the padlock as explained above.
Figure 6:
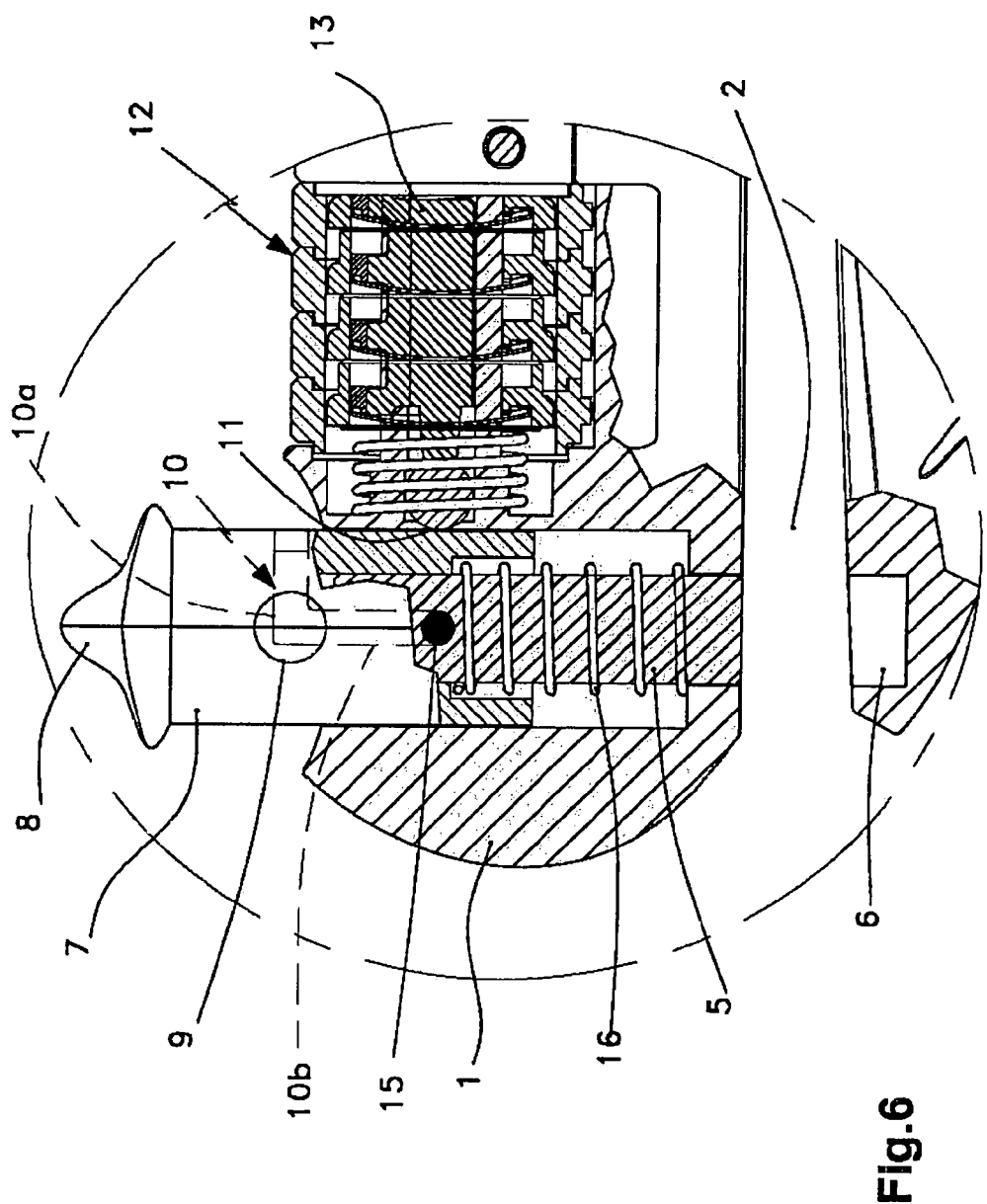
FIG. 6 is like the aforementioned FIGS. 4 and 5, but now refers to the culmination of the opening operation that shows the padlock open and withdrawn from the disk brake (3).

Operation of this structure is illustrated in FIG. 4 itself in conjunction with FIGS. 5 and 6. In FIG. 4, the padlock is closed and positioned in a brake disk (3) through one of its orifices (4); in this state, the latch (5) is in its locking mechanism (6), the cylinder (7) is retracted in the body (1), the helical spring (6) is compressed, the pin (15) establishes contact with the extreme of the horizontal branch (10a) of the groove (10), the ball (11) is in the spherical indentation (9), the shaft (13) is against the ball (11) by the pushing action of the opposing spring (14) and cannot move back because the combination wheels of the lock (12) are not in the code position. In FIG. 5, the wheels of the combination lock are in the code position, the shaft (13) has retracted, compressing the opposing spring (14); the ball (11) appears outside of the spherical indentation (9) because the cylinder (7) has been turned by one quarter of a turn, acting on the handle (8), with which the ball (11) of the spherical indentation (9) has been caused to come out and the pin (15) remains in the top part of the vertical branch (10b) of the groove (10) and, due to expansion of the helical spring (16), the cylinder (7) rises to the position shown in FIG. 6, where the latch (5) has been dragged outside of the locking mechanism (6) and of the orifice (4) of the brake disk (3), remaining retracted inside the body (1) of the padlock; as has been describe before, the mere fact of setting the opening code in the lock (12) does not determine retraction of the latch (5) because the position is maintained by the position of the pin (15) in the horizontal branch (10a) of the indentation (10), which is shown in FIG. 4, provided the user does not turn by one quarter as mentioned above.

The invention claimed is:

1. A padlock for a motorcycle brake disk comprising a body having a neck whose width is adapted to be the thickness of a motorcycle brake disk a latch that operates between an unlocked position within the body and a locked position in which said latch having a tip that penetrates an orifice of the brake disk and into a locking mechanism inside the body, wherein said latch has a tail immobilised in one end of a cylinder, said cylinder is accommodated in the body and enables sliding rotary and axial movement, said cylinder is closed at the other end and externally forms a handle that rests on the periphery of said body, said cylinder comprises on the periphery of said cylinder a spherical indentation and a groove, the spherical indentation being reciprocal to a ball which, in diametrical opposition, is applied against one end of a shaft, said shaft belongs to a rotary-ring combination lock the other end of said shaft presses against an opposing spring which presses said shaft against said ball, and said groove has an "L" shape determined by a horizontal branch and a vertical branch, in which, there is located a pin anchored in said body, said vertical branch extends from said horizontal branch towards said locking mechanism with an effective length equal to an operative distance between said unlocked position and said locked positions of the latch; between the cylinder and a base accommodated in said body there is inserted a helical spring that has a relatively compressed state in which the latch is in the locked position and the pin is in the horizontal branch or in the top extreme of the vertical branch of said groove, and said helical spring has a relatively distended state in which the latch is in the unlocked position in the body, the cylinder protrudes beyond said body and the pin is in the bottom extreme of the vertical branch of the groove.

2. The padlock for a motorcycle brake disk, according to claim 1, wherein the horizontal branch of the groove has a rotary extension of one quarter of a turn.

3. The padlock for a motorcycle brake disk, according to claim 1, wherein there is a rotary offset between the spherical indentation and the start of the horizontal branch of the groove.

4. The padlock for a motorcycle brake disk, according to claim 3, wherein the rotary offset is one quarter of a turn according to a direction of rotation in which said pin passes through the horizontal branch of the groove until said pin meets up with the vertical branch.

* * * * *